United States Patent
Fattic, II et al.

(10) Patent No.: US 7,958,448 B2
(45) Date of Patent: Jun. 7, 2011

(54) SYSTEMS, METHODS, USER INTERFACES, AND COMPUTER-READABLE MEDIA FOR ACTIVATING AND MANAGING FONTS

(75) Inventors: Richard G. Fattic, II, Portland, OR (US); Elden Wood, Vancouver, WA (US)

(73) Assignee: Celartem, Inc., Portland, OR (US)

( * ) Notice: Subject to any disclaimer, the term of this patent is extended or adjusted under 35 U.S.C. 154(b) by 878 days.

(21) Appl. No.: 11/552,956

(22) Filed: Oct. 25, 2006

(65) Prior Publication Data

US 2007/0242072 A1 Oct. 18, 2007

Related U.S. Application Data

(60) Provisional application No. 60/730,551, filed on Oct. 25, 2005.

(51) Int. Cl.
*G06F 17/00* (2006.01)
(52) U.S. Cl. .................................................. 715/269
(58) Field of Classification Search .................. 715/269; 345/471
See application file for complete search history.

(56) References Cited

U.S. PATENT DOCUMENTS

| | | | | |
|---|---|---|---|---|
| 4,594,674 | A * | 6/1986 | Boulia et al. | 345/471 |
| 5,586,241 | A * | 12/1996 | Bauermeister et al. | 345/467 |
| 5,586,242 | A | 12/1996 | McQueen, III et al. | |
| 5,990,907 | A * | 11/1999 | Colletti | 345/467 |
| 6,826,728 | B1 * | 11/2004 | Horiyama | 715/210 |
| 6,882,344 | B1 | 4/2005 | Hayes et al. | |
| 7,197,707 | B2 * | 3/2007 | Cicchitelli et al. | 715/269 |
| 7,346,845 | B2 * | 3/2008 | Teshima | 715/269 |
| 7,403,297 | B2 * | 7/2008 | Engelman et al. | 358/1.11 |
| 7,478,325 | B2 * | 1/2009 | Foehr et al. | 715/269 |
| 7,539,939 | B1 * | 5/2009 | Schomer | 715/269 |
| 7,583,393 | B2 * | 9/2009 | Hodder et al. | 358/1.11 |
| 2001/0011364 | A1 * | 8/2001 | Stoub | 717/1 |
| 2001/0021937 | A1 * | 9/2001 | Cicchitelli et al. | 707/517 |
| 2002/0010723 | A1 * | 1/2002 | Nielsen | 707/529 |
| 2002/0010725 | A1 * | 1/2002 | Mo | 707/530 |
| 2003/0046314 | A1 * | 3/2003 | Morooka | 707/500 |
| 2003/0131321 | A1 * | 7/2003 | Teshima | 715/542 |
| 2004/0088657 | A1 * | 5/2004 | Brown et al. | 715/542 |
| 2005/0193336 | A1 * | 9/2005 | Fux et al. | 715/542 |
| 2006/0069992 | A1 * | 3/2006 | Hodder | 715/535 |
| 2006/0075341 | A1 * | 4/2006 | Lin et al. | 715/542 |

(Continued)

OTHER PUBLICATIONS

Probets et al., Substituting Outline Fonts for Bitmap Fonts in Archived PDF files, Google 2003, pp. 885-899.*

(Continued)

*Primary Examiner* — Cong-Lac Huynh
(74) *Attorney, Agent, or Firm* — Banner & Witcoff, Ltd.

(57) ABSTRACT

Systems and methods for activating and/or managing fonts allow users to selectively activate individual fonts from inside a multi-font suitcase by separating the individual fonts from a multi-font suitcase file. The separated font may then be saved in a font management "vault" or file that activates only the fonts desired and selected by the user. In this manner, individual fonts can be activated from a font suitcase file without requiring that the entire suitcase's set of fonts be activated and/or added to the font management vault. Users may designate and select different fonts, including different fonts from different foundries (and included in different multi-font suitcases) for a single electronic document (e.g., different fonts for different typeface types, etc.) or use in an application program. These features provide repeatability and predictability in electronic document rendering processes.

92 Claims, 6 Drawing Sheets

U.S. PATENT DOCUMENTS

| | | | | |
|---|---|---|---|---|
| 2006/0225038 | A1* | 10/2006 | Okabe | 717/120 |
| 2007/0086031 | A1* | 4/2007 | Li | 358/1.11 |
| 2008/0024806 | A1* | 1/2008 | Bacus et al. | 358/1.11 |
| 2009/0185222 | A1* | 7/2009 | Foehr et al. | 358/1.15 |
| 2009/0284778 | A1* | 11/2009 | Hodder et al. | 358/1.11 |

OTHER PUBLICATIONS

International Search Report in corresponding International Application, Application No. PCT/US2006/041894, mailed Oct. 22, 2007.

Anon: "Font Reserve Reviewer's Guide—Version 3.1" [Online] 2003, XP002454184 Retrieved from the Internet: URL:http://d1.extensis.com/downloads/FR/EN/P/FontReserve3.1_Reviewers_Guide.pdf>[retrieved on Oct. 8, 2007].

Long: "Extensis Suitcase 10: Heir to the Font-Management Throne?" CREATIVEPRO.COM, [Online] Jul. 31, 2001, XP002454183 Retrieved from the Internet: URL:http//www.creativepro.com/printerfriendly/store/14021.html> [retrieved on Oct. 5, 2007].

Neuburg: "Fontastic Voyage: Font Reserve 2.5" TidBITS, [Online] Mar. 8, 2000, XP002454192 Retrieved from the Internet: URL:http://db.tidbits.com/article/5837> [retrieved on Oct. 8, 2007].

* cited by examiner

SYSTEMS, METHODS, USER INTERFACES, AND COMPUTER-READABLE MEDIA FOR ACTIVATING AND MANAGING FONTS

RELATED APPLICATIONS

This application claims priority under 35 U.S.C. §119 to U.S. Provisional Patent Application No. 60/730,551 filed on Oct. 25, 2005, entitled "JIT Separation Summary," and naming Richard G. Fattic, II and Elden Wood as inventors, which application is incorporated entirely herein by reference.

FIELD OF THE INVENTION

The present invention generally relates to systems, methods, user interfaces, and computer-readable media with computer-executable instructions stored thereon for activating and/or managing fonts, e.g., for use when rendering electronic documents.

BACKGROUND

In the Macintosh® computer operating system (commercially available from Apple Computer, Inc.), many fonts (e.g., for rendering textual information) are provided in files commonly referred to as "suitcase" files. These suitcase files contain one or more fonts. When used, the Macintosh® operating system activates and deactivates an entire suitcase file at a time (also referred to as "in-place activation"). The result of this type of activation is that users have no control to activate only a subset of the fonts within a given suitcase file. Rather, the only means of font activation requires that all fonts inside the suitcase file must be activated.

This situation can cause various issues for users. For example, a computer operating system may include or have access to fonts from numerous sources (e.g., from numerous vendors or "foundries"). These fonts may have similar or identical names. For example, Foundry A may produce an "Arial" type font (e.g., including Arial Regular, Arial Bold, Arial Italics, Arial Bold/Italics, etc.), and Foundry B may produce its own version of an "Arial" type font (e.g., also including Arial Regular, Arial Bold, Arial Italics, Arial Bold/Italics, etc., or other similarly named fonts). While these fonts may appear similar (and even indistinguishable) to the naked eye, they may contain many differences and variations. For example, the various widths, lengths, and sizes of the lines and/or overall characters may vary somewhat for at least some characters of the two fonts, which can cause differences in line breaks and page breaks, depending on which font is used.

Because fonts from different foundries often have similar or overlapping names on the computer system (e.g., the font name "Arial" may be used by many foundries), the simple identification of a font by its font name (e.g., "Arial," "Arial Bold," "Arial Italics," "Arial Bold/Italics," "Arial Narrow," etc.) may be ambiguous. Typical computer operating systems, however, tend to activate fonts using font names, such as "postscript" names, which are ambiguous, or font "family" names, which are even more ambiguous. Therefore, when a system activates a font (e.g., an "Arial" font), the operating system cannot necessarily determine which specific foundry's "Arial" font is actually desired, due to the ambiguous and overlapping naming of fonts. Existing operating systems tend to handle this ambiguity by activating an existing font that is already in the system's memory (e.g., it uses the "Arial" font from the last activated foundry that remains in the memory). However, because fonts from various foundries may have some differences as described above, this default selection of the last activated font may result in different kerning, and thus it may cause the document to appear or reflow differently (e.g., with different line breaks or page breaks, etc.) from other or earlier renderings of the document and/or from one rendering to the next.

A more detailed example may help illustrate some issues experienced in using current font selection systems. In this example, a user may create or download an electronic document composed of three fonts, e.g., fonts "A," "B," and "C" (which may constitute, for example, an Arial font, a Times New Roman Arial font, and z Courier font. Fonts having these names (e.g., the same "postscript" names or "family" names) may be located in "suitcase files" from multiple foundries. For this specific electronic document, the user or its original author may intend font "A" to be generated from data in "suitcase" 1 (e.g., from Foundry 1), and intend fonts "B" and "C" to be generated from data in "suitcase" 2 (e.g., from Foundry 2). Unfortunately, in this example, ambiguity or uncertainty arises because "suitcase" 1 contains fonts "A" and "B" and "suitcase" 2 contains fonts "B" and "C" (i.e., font B is located in both suitcases, so a simple call for "font B" results in ambiguity as to which foundry's "font B" is desired).

To ensure that the proper fonts are available in existing operating systems when the electronic document is rendered (e.g., printed, displayed on the computer screen, etc.), a user would have to first load or activate the fonts from suitcase 1 first (which would activate fonts "A" and "B" from Foundry 1), and then the user would have to load or activate suitcase 2 (which would overwrite and activate font "B" from Foundry 1 with font "B" from Foundry 2 and activate font "C"). In this manner, the overall computer operating system would have font "A" from Foundry 1 activated and fonts "B" and "C" from Foundry 2 activated, as desired in this example. However, the loading and/or activation of multi-font suitcases in a certain order are not practical for several reasons. For example, it may be difficult for users to understand or determine in practice which fonts are contained in which suitcases. Moreover, it is nearly impossible to determine the order in which fonts were loaded into a memory after the fact. Also, for documents downloaded from another source or created by another author, the end user has no way of knowing which foundry's fonts were used when the document was created, and therefore, the end user may have no way of determining which foundry's fonts to select and/or the necessary order to assure proper rendering. For documents that are shared by multiple users, the original document author has no way of knowing or controlling the settings on other users' computer systems.

Therefore, is a need in the art for improved systems, methods, and computer interfaces for activating and managing fonts for rendering and printing electronic text using computer systems that can overcome or alleviate one or more of the various issues described above.

SUMMARY

Aspects of the present invention relate to systems, methods, and user interfaces for activating and/or managing fonts for use in electronic documents, as well as to computer-readable media including computer-executable instructions stored thereon for operating such systems, performing such methods, and/or providing and/or operating such user interfaces. Systems and methods in accordance with at least some examples of this invention allow users to selectively activate individual fonts from inside a multi-font suitcase by separating the individual fonts from a multi-font suitcase file. With various examples of the invention, a separated font may be stored in a font management "vault" or file. A separated font then can be activated apart from any other fonts in the suitcase in which the separated font was originally provided, allowing a user to activate only the fonts desired and selected by the user (e.g., only fonts associated with an individual font typeface, etc.). In this manner, individual fonts (e.g., representing a specific typeface, such as regular text, bold, italics, bold and italics, etc.) can be activated from a multi-font suitcase file without requiring that the entire suitcase's set of fonts be activated.

One feature of systems, methods, and user interfaces in accordance with at least some examples of this invention allows user designation and selection of different fonts, including different fonts from different foundries (and included in different multi-font suitcases), if desired, for a single electronic document (e.g., different fonts for different typeface types, etc.) or for use in an application program. This feature produces repeatability and predictability in electronic document rendering processes (such as printing, displaying on a computer screen, projecting onto a large screen, etc.).

BRIEF DESCRIPTION OF THE DRAWINGS

Various objects, features, and advantages of the present invention will be more readily apparent and more fully understood from the following detailed description, taken in connection with the appended drawings, in which.

DETAILED DESCRIPTION

Figure 1:
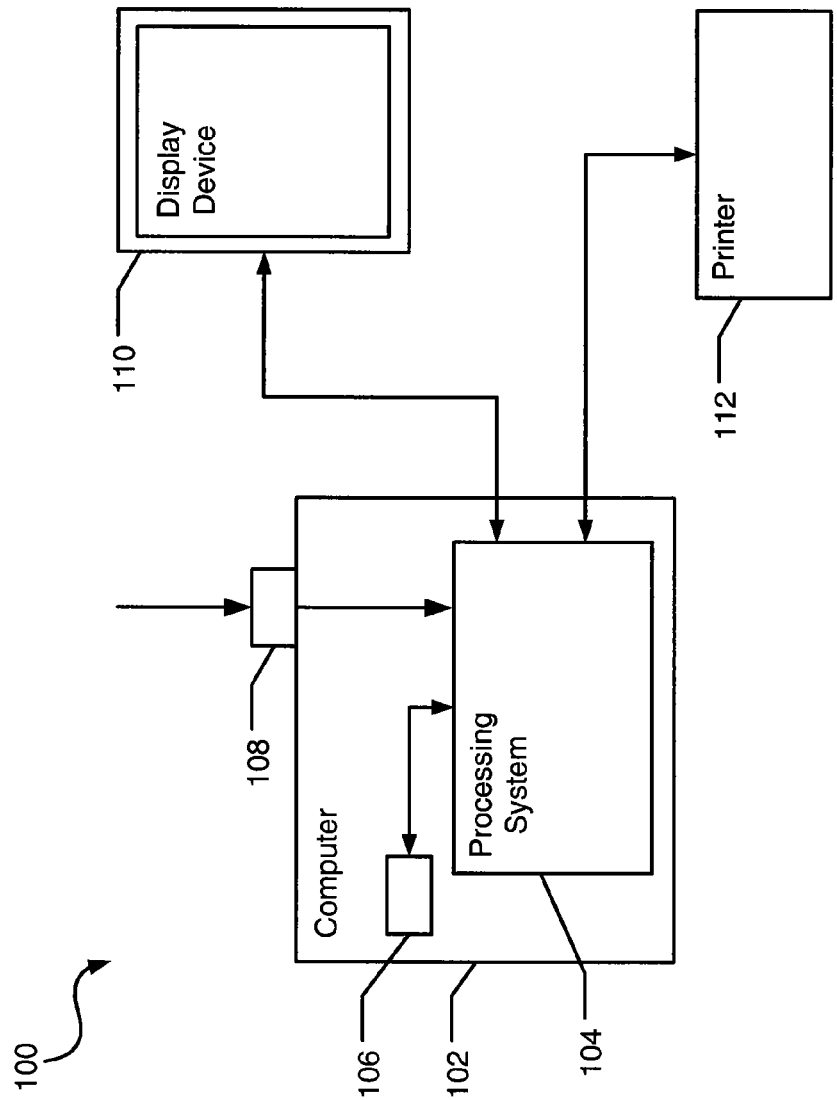
FIG. 1 illustrates an example computer system and environment in which one or more aspects of the present invention may be practiced.

As described above, aspects of the present invention relate to systems, methods, and computer-readable media for activating and/or managing fonts, e.g., for use in rendering electronic text, e.g., in electronic documents, in electronic/computer displays, in printouts, etc. Systems and methods in accordance with at least some examples of this invention allow users to selectively activate individual fonts from inside a multi-font suitcase by separating the individual fonts from a multi-font suitcase file. With some examples of the invention, a separated font may be saved in a font management "vault" or file that can be used to activate only the fonts desired and selected by the user. Alternately, a separated font may be activated immediately upon its selection by the user. Still further, a font may be separated from other fonts in the suitcase file simply by "marking" the font for subsequent activation separately from the other fonts in the suitcase file. Thus, a font may be separated from other fonts in a suitcase file by attaching or otherwise associating, e.g., metadata to the font. In this manner, individual fonts can be activated from a multi-font suitcase file without requiring that the entire suitcase's set of fonts be activated.

The following description is divided into sub-sections to assist the reader. The sub-sections include: General Description of Various Aspects of the Invention; Example Systems, Methods, and Computer-Readable Media According to the Invention; and Conclusion.

I. General Description of Various Aspects of the Invention

Aspects of the present invention relate to systems, methods, and user interfaces for activating and/or managing fonts for use in rendering electronic documents, as well as to computer-readable media including computer-executable instructions stored thereon for operating such systems, performing such methods, and/or providing and/or operating such user interfaces. General descriptions of these various aspects of the invention follow.

A. Methods for Activating and/or Managing Fonts

Methods for activating and/or managing fonts in accordance with at least some examples of this invention may include: (a) receiving input requesting activation of a font; (b) determining if the requested font is ready for activation; (c) when the font is not ready for activation: (i) identifying the font in a multi-font suitcase file, and (ii) separating the font from the multi-font suitcase file, and (d) activating the font. Other example methods for activating and/or managing active fonts on a computer system include: (a) receiving input requesting activation of a first font for rendering a first portion of an electronic document (e.g., for a first typeface type, etc.); (b) receiving input requesting activation of a second font for rendering a second portion of the electronic document (e.g., for a second typeface type, etc.); (c) determining if the first font and the second font are ready for activation; (d) when the first font is not ready for activation: (i) identifying the first font in a first multi-font suitcase file, and (ii) separating the first font from the first multi-font suitcase file; and (e) when the second font is not ready for activation: (i) identifying the second font in a second multi-font suitcase file, and (ii) separating the second font from the second multi-font suitcase file, and (f) activating the first font and the second font.

Font activation and/or management methods in accordance with examples of this invention may be operated from and/or may affect electronic documents and/or rendering of electronic text at any desired level on a computer system. For example, if desired, the fonts may be activated from and/or activated for use in at least a portion of an individual electronic document (e.g., as a default font, as a font for use at specifically indicated locations in a document, as a font for specific typeface types (such as bold, italics, bold and italics, regular type, etc.), etc.). As another example, if desired, the fonts may be activated from and/or activated for use in one or more overall application programs (e.g., such as a default font, as a font for use at specifically indicated locations, as a font for specific typeface types, etc.), such as in word processing programs, spreadsheet programs, email management programs, computer-aided design or other drawing programs, etc. As yet another example, if desired, the fonts may be activated from and/or activated for use in and/or throughout an overall computer operating system (e.g., as a default font, as a font for use at specifically indicated locations in documents, as a font for specific typeface types, etc.). Of course, methods according to the invention may allow users to have a great level of flexibility in designating specific fonts for use in all locations of electronic documents and/or computer operating system.

Data for generating input requesting activation of a font may be transmitted through, included in, or stored at any desired level of the computer system, such as a portion of an individual electronic document, as a portion of an application program (e.g., as a "default" or "preferred font" for various specific typeface types in one or more application programs, etc.), as a portion of a personal computer operating system, as a network setting, etc. The input requesting activation of the font also may be generated at any desired time without departing from the invention, such as when an electronic document is initially opened, when an application program is opened, when the personal computer operating system is started, at the time the rendering occurs, during pre-rendering processing, etc.

Still other methods for activating and/or managing fonts in accordance with at least some examples of this invention may include: (a) receiving input requesting activation of a font; (b) determining if the requested font already exists in a font management vault; (c) when the font does not exist in the font management vault: (i) identifying the font in a multi-font suitcase file, (ii) separating the font from the multi-font suitcase file, and (iii) saving the separated font in the font management vault (e.g., an electronic file on a computer-readable medium identifying and/or storing data relating to one or more selected fonts); and (d) activating the font from the font management vault. Methods in accordance with at least some examples of this invention may include additional steps, such as: creating the font management vault; rendering an electronic document, wherein at least some portion of the electronic document is rendered (e.g., printed, displayed on a computer screen, projected, etc.) using a font as activated from the font management vault; user selection of one or more fonts for inclusion in the font management vault; etc.

Yet other example methods for activating and/or managing active fonts on a computer system include: (a) receiving input requesting activation of a first font for rendering a first portion of an electronic document (e.g., for a first typeface type, etc.); (b) receiving input requesting activation of a second font for rendering a second portion of the electronic document (e.g., for a second typeface type, etc.); (c) determining if the first font and the second font already exist in a font management vault; (d) when the first font does not exist in the font management vault: (i) identifying the first font in a first multi-font suitcase file, (ii) separating the first font from the first multi-font suitcase file, and (iii) saving the separated first font in the font management vault; and (e) when the second font does not exist in the font management vault: (i) identifying the second font in a second multi-font suitcase file, (ii) separating the second font from the second multi-font suitcase file, and (iii) saving the separated second font in the font management vault. Such methods further may include: activating the first font and/or the second font from the font management vault; rendering the electronic document using the first font and the second font as activated from the font management vault; printing the electronic document using the first and second fonts; displaying the electronic document using the first and second fonts; creating the font management vault; receiving user input changing designated fonts for the first font and/or the second font; etc.

Any desired number of fonts may be used in and/or activated for use in an individual electronic document, application program, and/or computer operating system without departing from this invention. The various different activated and/or used fonts may be located in any different number of multi-font suitcase files without departing from this invention, including multi-font suitcase files of different sources, and the various selected individual fonts may be separated from their respective multi-font suitcase files. Further, separated fonts may be stored in one or more different font management vaults. Still further, if multiple font management vaults are employed, then the fonts in one font management vault may be activated in conjunction with or separately from the fonts in another font management vault. One advantageous feature of this invention allows user selection of different fonts, including different fonts from different foundries (and included in different multi-font suitcases) for a single electronic document (e.g., different fonts for different typeface types, etc.), which can help provide predictability and repeatability in the document rendering process and provides great flexibility for users.

Again, such methods may be initiated in, operated at, and affect any desired level of the computer-system without departing from the invention, such as the individual electronic document level, the application program level, the operating system level, the computer network level, etc.

Additional aspects of this invention relate to computer-readable media including computer-executable instructions stored thereon for performing the various font activating and/or managing methods described above.

B. Systems for Activating and/or Managing Fonts

Systems for activating and/or managing fonts in accordance with at least some examples of this invention may include: an input for receiving input data requesting activation of a font; and a processor system programmed and adapted to: (a) determine if the font is ready for activation, (b) when the font is not ready for activation: (i) identifying the font in a multi-font suitcase file, and (ii) separating the font from the multi-font suitcase file, and (c) activating the font. Other examples of systems for activating and/or managing active fonts on a computer system may include: an input for receiving input data requesting activation of a first font for rendering a first portion of an electronic document (e.g., for a first typeface type, etc.) and a second font for rendering a second portion of the electronic document (e.g., for a second typeface type, etc.); and a processor system programmed and adapted to: (a) determine if the first font and the second font are ready for activation, (b) when the first font is not ready for activation: (i) identifying the first font in a first multi-font suitcase file, and (ii) separating the first font from the first multi-font suitcase file, (c) when the second font is not ready for activation: (i) identifying the second font in a second multi-font suitcase file, and (ii) separating the second font from the second multi-font suitcase file, and (d) activating the first and second fonts.

Still other systems for activating and/or managing fonts in accordance with at least some examples of this invention may include an input for receiving input data requesting activation of a font; and a processor system programmed and adapted to: (a) determine if the font already exists in a font management vault, (b) when the font does not exist in the font management vault: (i) identifying the font in a multi-font suitcase file, (ii) separating the font from the multi-font suitcase file, and (iii) saving the separated font in the font management vault, and (c) activating the font from the font management vault. The processor system further may be programmed and adapted to: create the font management vault; render an electronic document using the font as activated from the font management vault; etc. Systems in accordance with at least some examples of this invention further may include, for example: a display device for displaying an electronic document using the font as activated from the font management vault; a printing system for printing an electronic document using the font as activated from the font management vault; and other features of electronic displays and/or computer systems, including other features that are conventionally known and used in the art.

Yet other examples of systems for activating and/or managing active fonts on a computer system may include: an input for receiving input data requesting activation of a first font for rendering a first portion of an electronic document (e.g., for a first typeface type, etc.) and a second font for rendering a second portion of the electronic document (e.g., for a second typeface type, etc.); and a processor system programmed and adapted to: (a) determine if the first font and the second font already exist in a font management vault, (b) when the first font does not exist in the font management vault: (i) identifying the first font in a first multi-font suitcase file, (ii) separating the first font from the first multi-font suitcase file, and (iii) saving the separated first font in the font management vault, and (c) when the second font does not exist in the font management vault: (i) identifying the second font in a second multi-font suitcase file, (ii) separating the second font from the second multi-font suitcase file, and (iii) saving the separated second font in the font management vault. The processor system further may be programmed and adapted to: create the font management vault; activate the first font and/or the second font from the font management vault; render an electronic document using the first and second fonts; receive user input changing designated fonts for the first and/or second fonts; etc.

Systems in accordance with examples of this invention may activate and use any number of fonts without departing from this invention, e.g., by including the desired fonts in the font management vault in the manner described above. The various selected fonts may be located in any number of multi-font suitcase files without departing from this invention (e.g., they may all be found in a single multi-font suitcase file or one or more of the fonts may be located in a different multi-font suitcase file from the others). Further, separated fonts may be stored in one or more font management vaults. Also, if multiple font management vaults are employed, then the fonts in one font management vault may be activated in conjunction with or separately from the fonts in one font management vault.

Such systems may be operated at or from any desired level of a computer system without departing from the invention, such as within or from an individual electronic document level, within or from an application program level, within or from an operating system level, within or from a computer network level, etc. Also, the fonts as activated and/or managed in the various systems described above may be used at any level of a computer system, including, for example, the individual electronic document level, the application program level, the operating system level, the computer network level, etc.

Still additional aspects of this invention relate to computer-readable media including computer-executable instructions stored thereon for operating the various font activating and/or managing systems described above.

C. User Interfaces for Activating and/or Managing Fonts

Additional aspects of this invention relate to user interfaces for activating and/or managing fonts for use on a computer system (e.g., for using and/or operating the various methods and/or systems described above). Such user interfaces may include: (a) a first display portion displaying at least a portion of available fonts for the computer system, wherein the available fonts include plural multi-font suitcase files, wherein the first display portion further allows display of individual fonts available in the plural multi-font suitcase files; and (b) a second display portion displaying selection of one or more individual fonts for separation from the plural multi-font suitcase files. For example, the second display portion may display selection of one or more individual fonts for separation from the plural multi-font suitcase files and inclusion in a font management vault. With some examples of the invention, at least one of the first display portion or the second display portion further allows receipt of user input requesting activation of at least a first separated individual font and a second separated individual font. With some implementations of the invention, for example, at least one of the first display portion or the second display portion further allows receipt of user input requesting activation of at least a first separated individual font and a second separated individual font from a font management vault.

The user interface, including at least one of the first display portion or the second display portion, may be activated and used at any level on the computer system, such as at the electronic document level, at the application program level, at the personal computer operating system level, at the computer network level, etc. Of course, any desired number of individual fonts may be activated through the user interface without departing from the invention (e.g., by user selective indication for including the individual font in the font management vault). Further, separated fonts may be stored in one or more font management vaults. Still further, if multiple font management vaults are employed, then the fonts in one font management vault may be activated in conjunction with or separately from the fonts in one font management vault.

The individual fonts for inclusion in and/or activation through the font management vault may be selected from any desired number of multi-font suitcase files without departing from this invention. One feature of this invention allows user selection of different fonts, including different fonts from different foundries (and included in different multi-font suitcases) for a single electronic document (e.g., different fonts for different typeface types, etc.), which can provide predicatability and repeatability in the document rendering process.

The various display portions of the user interface may be displayed consecutively, concurrently, overlappingly, and/or in any other desired manner without departing from this invention.

Still additional aspects of this invention relate to computer-readable media including computer-executable instructions stored thereon for providing and/or operating the various user interfaces described above.

Given the above general description of various example aspects of the invention, more detailed examples of systems, methods, and user interfaces according to the invention will be described below in conjunction with the attached drawings. The specific figures and information contained in this detailed description should not be construed as limiting the invention.

II. Example Systems, Methods, and Computer-Readable Media According to the Invention FIG. 1 illustrates an example general purpose computer system or environment 100 in which aspects of the present invention may be practiced or used. The computer system or environment 100 includes a computer 102 having a processing system 104 (including one or more computer processors, such as microprocessors). The processing system 104 is operatively connected with a memory system 106 that may contain data stored on, used by, and/or used for operating the computer system 100 (e.g., stored in ROM or RAM, etc.).

One or more input devices 108 (examples of which will be described in more detail below) may be provided for receiving input data for storage and/or use by the computer system 100.

A wide variety of memory systems 106 and/or input devices 108 may be provided for the computer system 100 without departing from this invention. For example, the computer 102 may include one or more of: a hard disk drive for reading from and writing to a hard disk; a magnetic disk drive for reading from or writing to a removable magnetic disk; an optical disk drive for reading from or writing to a removable optical disk, such as a CD ROM or other optical media; etc. These drives (inputs) and their associated computer-readable media (memory) allow data input and provide nonvolatile storage of computer-readable instructions, data structures, program modules, and other data for the computer system 100. It will be appreciated by those skilled in the art that other types of computer-readable media that can store data that is accessible by a computer, such as magnetic cassettes, flash memory cards, digital video disks, Bernoulli cartridges, random access memories (RAMs), read only memories (ROMs), and the like, also may be used in the example computer environment 100.

As further input devices 108, users can enter commands, data, and other information into the computer system 100 through various input devices 108, such as a keyboard and pointing device (such as a mouse, touchpad, rollerball, or stylus), as well as their input ports. Other input devices (not shown) may include a microphone, joystick, game pad, satellite dish, scanner, wireless receiver, or the like, as well as their input ports. These and/or other input devices 108 may be connected to the processing system 104, e.g., through a serial port interface, a parallel port, a game port, a universal serial bus (USB), and the like. Further still, these devices may be coupled directly to the system bus via an appropriate interface (not shown). Input systems and their use in a computing environment 100 like that described above are conventional and well known in the art.

A monitor 110 or other type of display or rendering device also may be connected to the computer 102, e.g., via an appropriate interface, such as a video adapter. In addition to the monitor 110, computer systems 100 typically include other peripheral output devices, such as speakers (not shown) and printers 112. Any type of rendering device (such as monitor 110 and/or printer 112), for rendering electronic text of any type and/or for any purpose, may be used without departing from this invention.

The computer system 100 can operate in a networked environment using logical connections to one or more remote computers, such as a remote computer. The remote computer can be a server, a router, a network PC, a peer device, or other common network node, and it may include many or all of the various elements described above relative to the computer system 100. The logical connections may include a local area network (LAN) and a wide area network (WAN). Such networking environments are commonplace in homes, offices, enterprise-wide computer networks, intranets, and the Internet, using both wired and wireless connections. Any desired manner of networking the computer system 100, including conventional manners that are known and used in this art, may be used without departing from this invention.

The overall environment 100 in which aspects of the present invention may be performed or practiced include a wide variety of hardware systems, including any hardware systems on which electronic textual information is rendered (e.g., in hard or soft copies). More specific examples of various types of computing systems 100 on which aspects of this invention may be practiced include: personal computers (e.g., including both desktop and laptop models); pen-based computing systems (or "tablet PCs," including, for example, convertible laptops or "slate" type tablet PCs); hand-held or palm-top computing systems; personal digital assistants; pocket personal computers; mobile and cellular telephones, pagers, and other communication devices; watches; appliances; and any other devices or systems that include a monitor or other display or rendering device that presents printed information (hard copy or electronic copy) to users. Additionally, aspects of the present invention can be practiced on a wide variety of computing systems 100 like those described above in conjunction with FIG. 1, including various hardware systems that are commercially available and known in the art.

Figure 2:
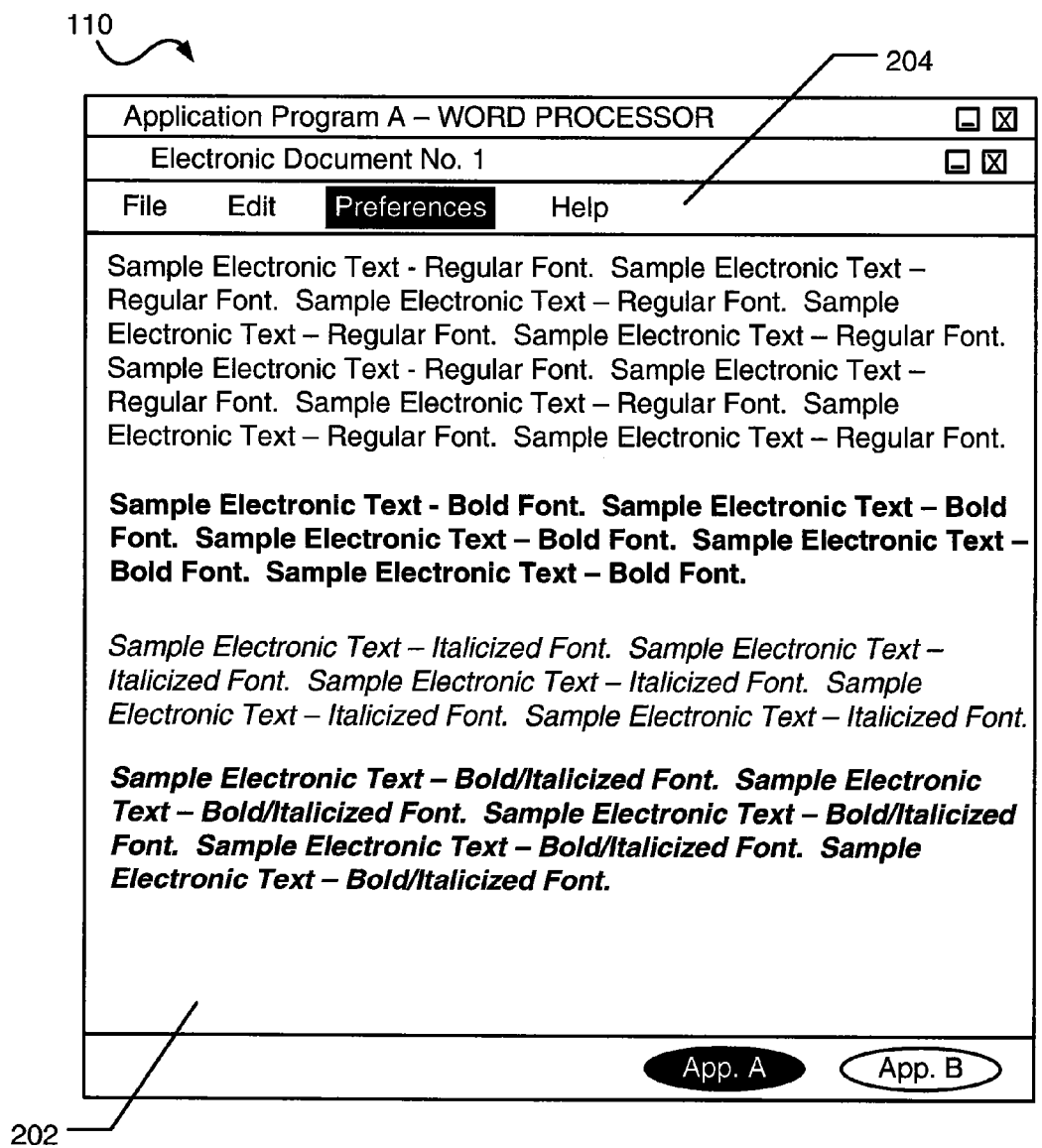
FIG. 2 illustrates a display screen including various font facetypes that may be selectively controlled in systems and methods in accordance with examples of this invention.

As described above, a display device 110 and/or a printer 112 may be provided with the computer system 100 for rendering text. FIG. 2 further helps illustrate aspects of the present invention. More specifically, FIG. 2 illustrates an example of a display device 110 including a display screen 202 for displaying graphical, textual, and/or other information provided to or generated by a computer system 100. In this illustrated example, the display screen 202 has rendered electronic text information in various fonts. Specifically, the uppermost section of the display screen 202 illustrates electronic text in a regular "Arial" font; the second section of the display screen 202 illustrates electronic text in an "Arial Bold" font; the third section of the display screen 202 illustrates electronic text in an "Arial Italics" font; and the bottommost section of the display screen 202 illustrates text in an "Arial Bold/Italicized" font.

As described above, a computer system may contain fonts from several different sources or "foundries," and these different sources or foundries may utilize similar names in naming their fonts (e.g., the general font name "Arial" along with various generic terms, such as "regular," "bold," "italics," etc.). Because of the use of overlapping and similar font family names and other names (such as "regular," "bold," "italics," etc.), there can be ambiguity as to which specific fonts a computer system should use when an electronic document is rendered (e.g., which specific foundry's fonts are intended to be used in the rendering). Because of these potential ambiguities, when ambiguity exists, conventional computer operating systems use the fonts from the foundry or other source that currently exist in its memory. This default selection of the font that happens to exist in the computer memory can cause issues with the electronic document rendering, e.g., page breaks and/or line breaks may change somewhat from one rendering to the next, depending on which source's fonts are used, due to minor differences in the various fonts from the different foundries. These potential changes in rendering can cause undesired and unpredictable results (e.g., by making the document appear different depending on the characteristics of the system in which it is opened, the time at which it is opened, etc.). Such differences also can make it difficult for multiple users to work on a given electronic document (one user's version of the document may differ from another user's version, thereby making it difficult for the users to locate and discuss specific features of the document).

Figure 3:
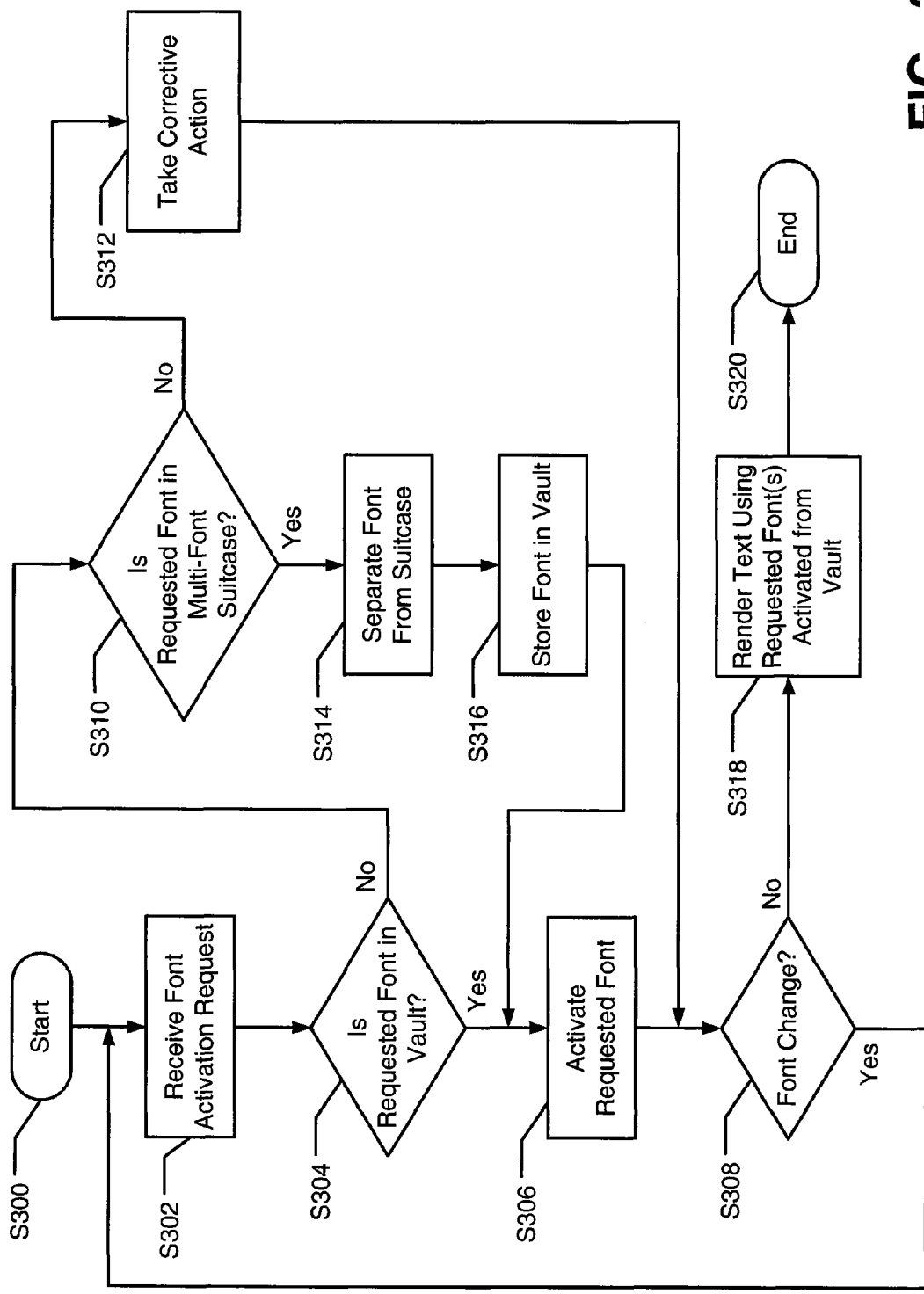
FIG. 3 provides a flow diagram illustrating various example methods and example operation of systems in accordance with this invention.

Aspects of this invention allow users, document creators, or others to selectively control and designate fonts (e.g., font typeface types, etc.) to use in electronic documents. FIG. 3 illustrates one example method in accordance with this invention through which users or others can control and designate the fonts to be used in rendering one or more electronic documents. The method of FIG. 3 starts (S300), for example, when an electronic document is opened, being prepared for rendering, etc., e.g., for display on a display screen 202, for printing, etc. While the method of FIG. 3 may take place at any desired time in the opening and/or rendering process (e.g., as the rendering is taking place, before it starts, etc.), in accordance with at least some examples of this invention, prior to the actual rendering, the computer system will prepare the electronic document for rendering by determining the specific fonts required by the electronic document (as document opening begins). Therefore, in this example method, the first step S302 includes reviewing the electronic document to determine which fonts require activation. This may be accomplished, for example, by the computer searching through the data relating to the electronic document and determining which fonts are used and/or to locate font change indicators or flags. Systems and methods according to examples of this invention may allow users and/or the system to provide unique identifiers for each font, including each individual font typeface, etc., to assure that the specifically desired font is used for a rendering (i.e., both the generally desired font type (such as "Arial") as well as the specific foundry or other source for that font), as will be described in more detail below. If desired, each electronic document may include a file stored in or associated with it that indicates the various fonts used in the electronic document e.g., stored as metadata, etc.). Information from this file may be input to or communicated to the font management vault on the computer controlling the rendering of the electronic document.

When a font designation or "font activation request" is received or located at S302, systems and methods according to this example of the invention then determine whether the requested font ready for activation. For example, if fonts are activated from a "font management vault" or "font vault", then systems and methods according to this example of the invention will determine if the requested font already is included as part of the fonts stored in the system's "font management vault" or "font vault" (S304). A "font management vault," in accordance with at least some examples of this invention, constitutes a file that designates specific fonts to be used by the system for various print typefaces, selected portions of text, etc. (e.g., fonts to be used for regular electronic text, fonts for bolded text, fonts for italicized text, fonts for bolded and italicized text, etc.). When the requested font already is located in the font management vault (answer "Yes" at S304), systems and methods according to this example of the invention may activate the requested font or allow it to remain activated (S306). Then, systems and methods according to this example of the invention continue looking through the document (or through its metadata or other associated information, as described above) to determine if further font changes (or font activation requests) are present (S308). If "yes," the process returns to S302 and repeats.

When the requested font is not located in the font management vault for the computer system (answer "No" at S304), the systems and methods according to this example of the invention then determine whether the requested font can be found in one of the multi-font suitcase files available on or accessible through the computer system for the rendering (S310). If "no," systems and methods according to this example of the invention may send an error message, may ask the user to select a new font, may automatically select a default font (optionally based on the previously received font activation request), or may take other appropriate corrective action (S312). The systems and methods then return to S308, looking for additional font changes (e.g., based on receipt of user input taking corrective action in response to S312, based on other font changes contained in the document after automatic corrective action at S312, based on other font changes already present in the document, etc.), and the procedure repeats.

If, at S310, the font requested for activation is located in one of the multi-font suitcase files available on or accessible through the computer system, systems and methods according to this example of the invention then will separate that specific font from the other fonts in the suitcase file (S314) and store that specific font in the font management vault for the computer system (S316). It should be noted that, in the illustrated example, separation of the requested font (S314) and storage of the requested font (S316) are shown as two different steps. It should be appreciated, however, that with various examples of the invention, the separation of the requested font from its suitcase file and the storage of the requested font into the font management vault may be combined into a single step.

By separating out the requested font from the others in the multi-font suitcase file and storing it in the font management vault, ambiguities in the desired fonts (e.g., for use for various typefaces, etc.) and unpredictability in the fonts used for the rendering can be avoided, e.g., as compared to the situation in conventional systems and methods when all fonts in a multi-font suitcase file are activated when use of any specific font within that suitcase is desired. Systems and methods according to this example of the invention then may return to S306, where the desired and requested font is activated, and the procedure continues looking for new fonts requested within the electronic document to activate (S308).

Once all of the fonts for a specific electronic document and/or a specific rendering thereof (or desired portion thereof) have been identified and no additional font changes are present in the document or portion thereof to be rendered (answer "No" at S308), systems and methods according to this example of the invention proceed to render the electronic text or document using the requested and activated fonts from the font management vault (S318). Any type of rendering may be provided without departing from this invention, such as printing a hard copy, display on a computer display screen, projecting from a projection device, etc. Once the rendering is complete, the process may end at S320 (e.g., wait for additional user input or commands, conduct other processing, etc.).

Systems and methods according to examples of the invention, like those described above in conjunction with FIG. 3 and those described below in more detail with respect to FIGS. 2 and 4-6, allow users to manage the fonts used (and the content and designations of the font management vault) outside the font vault. If a user attempts to activate a single font typeface (e.g., one from a source different from the source(s) of fonts utilized for other typefaces), then the font manager will read the actual suitcase font file and "just in time" create one file per font typeface and put the newly created single font files into the vault. The user need not be aware that this processing takes place in response to their font activation request. The font manager then may activate the font files within the vault that correspond to the individual font typefaces the user needs to have activated. In such situations, the user interface still only may show the original suitcase file and may display a status indicating that the individual fonts the users activated are activated and will further indicate the other fonts in the file as not being activated. This presentation in the U/I allows the user workflow to proceed without interruption because the user does not have to go through any preparation steps to separate the fonts into individual files. This font separation procedure provides streamlined workflow for the user.

FIGS. 2 and 4-6 illustrate various examples and features of user interfaces that may be used to selectively control and designate fonts for use in rendering electronic documents, e.g., in the various systems and methods described above. As mentioned above, FIG. 2 illustrates an example of a display device 110 including a display screen 202 displaying electronic text having various different fonts (e.g., different font typefaces, etc.). In this illustrated example, the electronic document is generated through a word processing application program, although aspects of this invention may be used in conjunction with any type of electronic text, generated by or through any type of program or application program, including, for example, electronic text generated by or through: a computer operating system, an email management program, a spreadsheet program, an electronic drawing or CAD type program, video game programs, document management programs, accounting programs, internet access or browser programs, etc. In this example system, method, and computer interface, the application program allows users to access and control the content of the font management vault. While any desired manner of accessing and controlling the content of the font management vault may be used without departing from this invention, in this illustrated example, a "toolbar" 204 generated by the application includes a route through which access to and control of the font management vault may be accomplished.

More specifically, as shown in FIG. 2, the toolbar 204 includes an icon labeled "Preferences" through which an individual user can enter desired "selections" that control the manner in which the document renders or appears. Selecting this icon (as illustrated by the darkened background in FIG. 2), produces a "drop-down" menu 206 listing various items that may be controlled by the user (e.g., based on the user's "preferences"). In this illustrated example, as shown in FIG. 4, the drop-down menu 206 includes items such as "Font Color" and "Background Color," in addition to "Font Types." Of course, any number of user controllable "preferences" associated with an electronic document and/or its display or rendering may be included in the drop-down menu 206, as illustrated by the expansion arrow icon 208 shown in FIG. 4.

Figure 4:
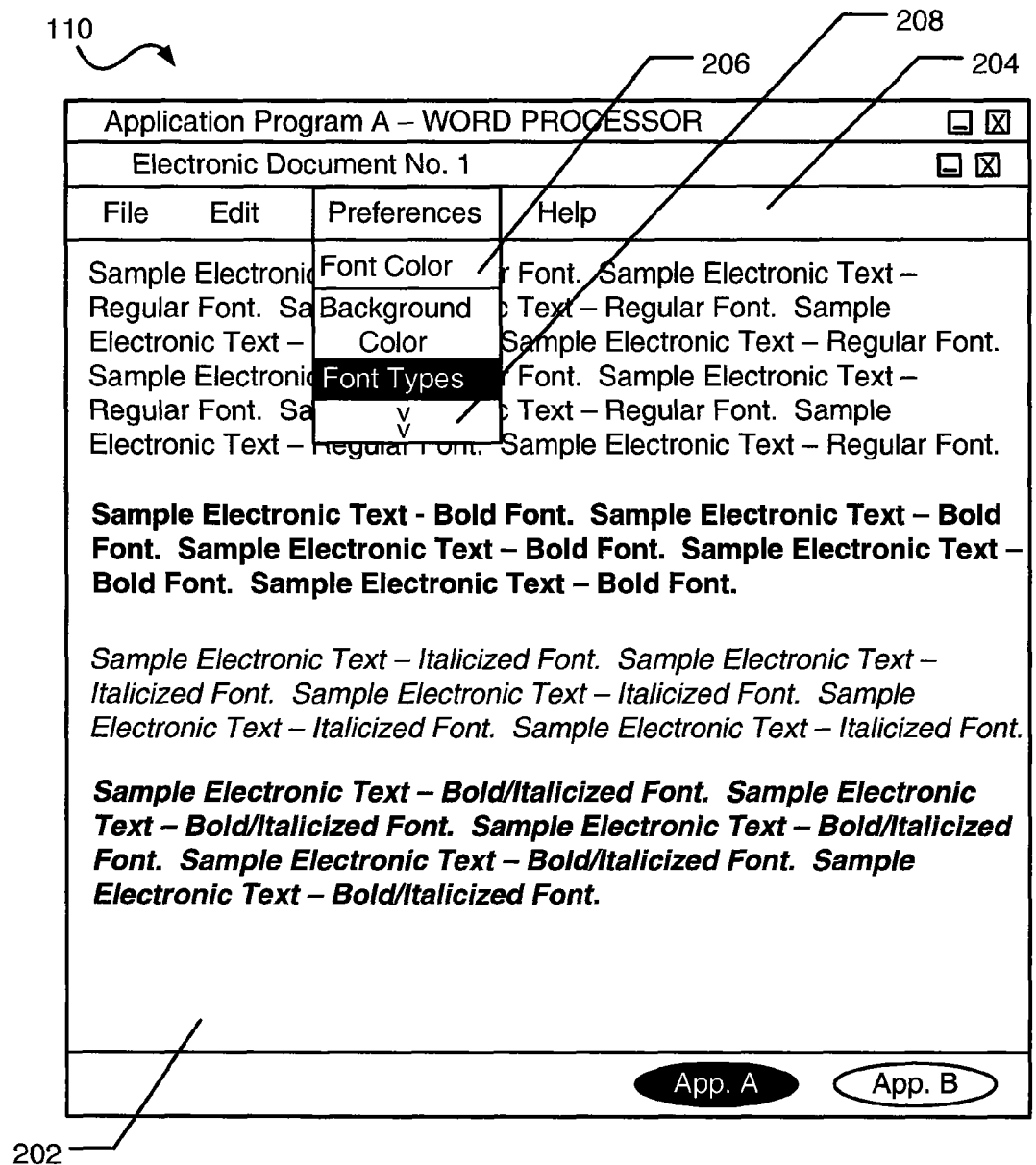
FIGS. 4 through 6 (along with FIG. 2) illustrate various examples of features of user interfaces and the operation of systems and methods in accordance with examples of this invention.
Figure 5:
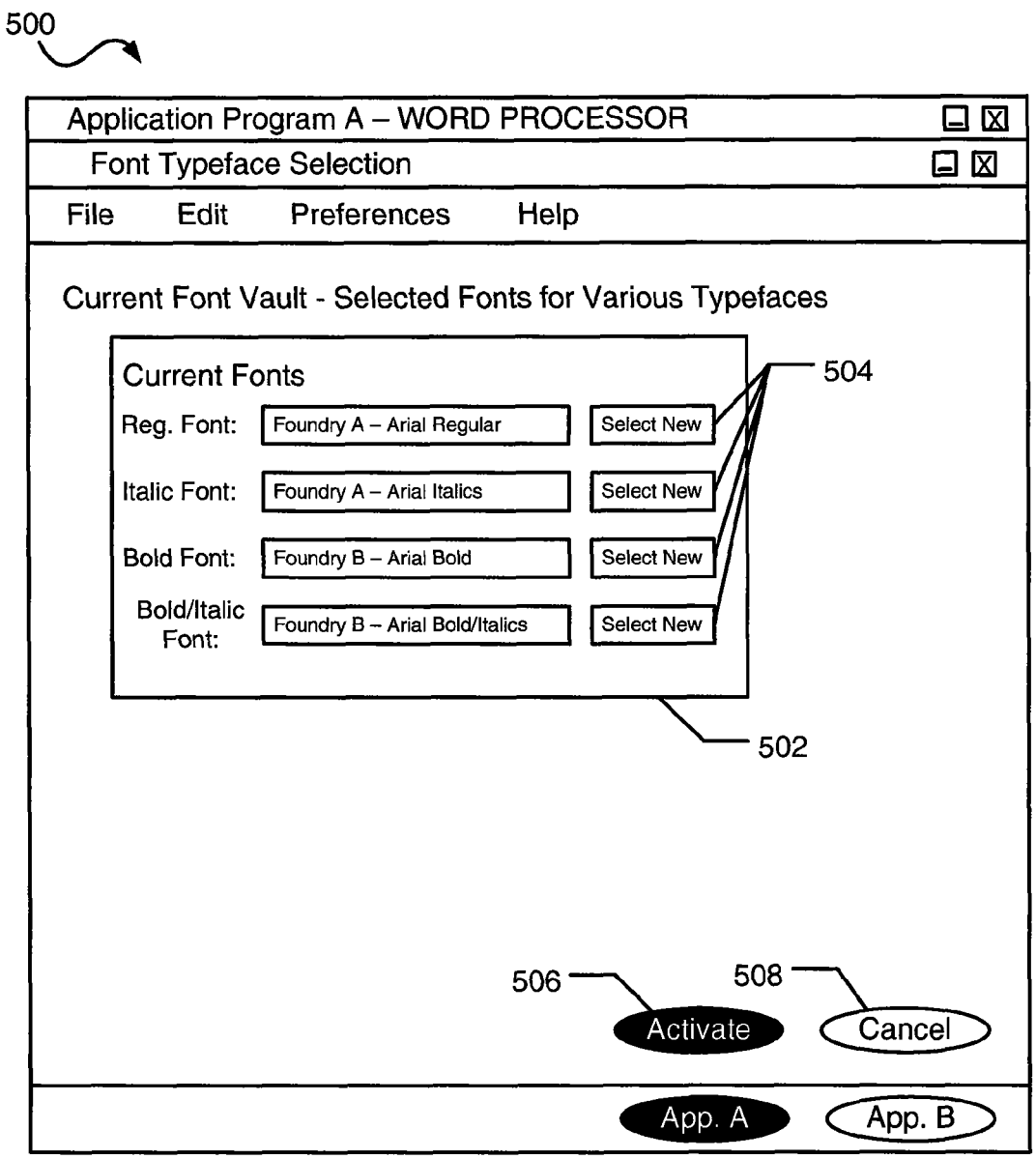

When the "Font Types" icon is selected, as illustrated by the darkened background in FIG. 4, another user interface display 500 appears in this example system and method, as illustrated in FIG. 5. Such displays 500 may appear in any desired form and/or in any desired manner without departing from this invention, such as a separately activated screen or display panel, as an overlay over some or all of existing display screen 110, etc. Also, while any desired number of fonts and/or types of information may be presented in display 500, some specific examples are described in more detail below.

In this example user interface display 500, a user is allowed to select various different fonts for certain typefaces in electronic documents. The user interface display 500 includes a panel 502 indicating the content of the font management vault, e.g., the currently selected or designated fonts for rendering various typefaces in an electronic document. While any set or subset of electronic text may be included or listed in panel 502, the illustrated example panel 502 includes listings of the specific fonts (including foundry or source and specific font type) to be used and currently selected for four specific categories of electronic text typeface, namely: regular electronic text, italicized electronic text, bolded electronic text, and bolded and italicized electronic text. As noted above, this user interface portion or panel 502 identifies the current content of the font management vault.

The user interface portion or panel 502 further includes icons 504 that allow user selection of new fonts for the various font typefaces. Activation of one of icons 504 allows a user to selectively change, designate, and control the font type for the selected typeface. Activation of an icon 504, in this illustrated example, may be used to pull up a listing or partial listing of fonts available on and/or accessible through the computer system that may be selected and designated for inclusion in the font management vault (e.g., a listing like that shown in panel 602 described in more detail below in conjunction with FIG. 6, as a separate panel, as an overlay, etc.). Alternatively, if desired, a user may directly enter the desired new font, e.g., by typing in the desired information directly in a selected box. Selection of a new font for a specific typeface will result in deletion of the previously selected or designated font from that typeface designation in the panel 502 and inclusion of the newly selected or entered font for that typeface in panel 502. Selection of the "Activate" button 506 will result in activation of the fonts then present in the font management vault, and selection of the "Cancel" button 508 will result in closure of the Font Typeface Selection interface 500 without changing the previously designated fonts in the font management vault.

As illustrated in FIG. 5, any desired combination of fonts, from any desired sources, may be used for the various different typefaces or other designated portions of an electronic document without departing from this invention. For example, as illustrated in FIG. 5, while all of the currently designated fonts in the font vault are "Arial" type fonts, the designated fonts for the various typefaces may be from the same or different sources or foundries, if desired. Also, if desired, completely different fonts may be used for the various typefaces or other designated text within an electronic document, without departing from this invention. For example, if desired, while the regular font may be Arial type font, the bolded and/or italicized font may be Times New Roman, Courier, or another font type, if desired, e.g., to further help these selected font facetypes stand out in a given rendering of an electronic document. Of course, if desired, all of the designated fonts in panel 502 may be from the same source or foundry, without departing from this invention.

Also, wide variations in presentation of the available fonts may be provided when one of the "Select New" icons 504 is selected. For example, if desired, systems and methods according to examples of this invention may pull up a simple listing of all available fonts on or accessible through the computer system (e.g., an alphabetical listing, a listing sorted by foundry or source, etc.). As another example, systems and methods according to at least some examples of this invention may pull up a listing based or sorted, at least in part, on the currently designated fonts (e.g., the listing may be sorted to include fonts from the same foundry or source at the top, to include other "Arial" (or other designated) fonts near the top, to include other similarly appearing fonts near the top, etc.). Any desired presentation of available fonts may be provided without departing from this invention.

Figure 6:
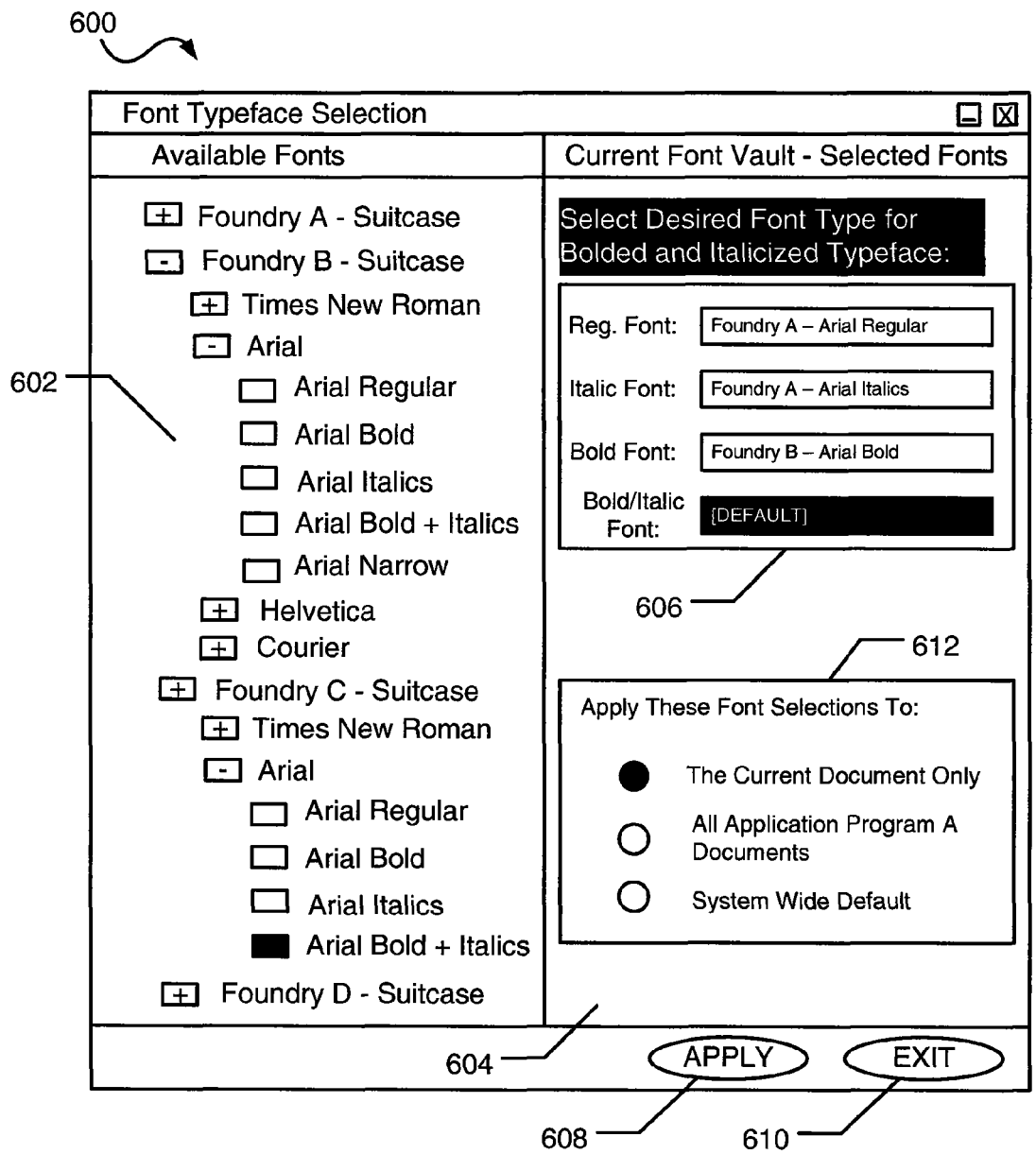

FIG. 6 illustrates another example display screen 600 that may be included in a user interface for selecting and/or controlling the fonts used for various portions of an electronic document, such as the fonts used for various different typeface types in an electronic document (e.g., the regular font, the bolded font, the italicized font, the bolded and italicized font, etc.). As shown in FIG. 6, the user interface screen 600 of this example includes a first portion or panel 602 including at least a partial listing of fonts available on and/or accessible through the computer. This listing in panel 602 may include fonts from various different sources or foundries (and also, as noted above, these fonts may tend to have similar names or identifiers, as is common). The fonts from certain sources (or at least portions thereof) are housed in "multi-font suitcase files," which in turn may contain several general font types (e.g., Arial, Courier, Times New Roman, etc.), which in turn may contain one or more individual font typefaces (e.g., Arial Regular, Arial Bold, Arial Italics, Arial Bold/Italics, etc.).

The example user interface display screen 600 of FIG. 6 further includes a font management vault display portion or panel 604. This portion or panel 604 displays existing font selections for various typefaces (or other portions of electronic text), and/or it can accept for changes and/or selection of new or different fonts for various typefaces (or other portions of electronic text). While a wide variety of different interaction methods and mechanisms may be used without departing from this invention, in the illustrated example, the font management vault display portion or panel 604 includes a selection portion or panel 606 that lists the existing selected fonts for various typefaces (or other portions of electronic text). Selecting one of the typefaces or other present electronic text categories from panel 606 (as indicated in FIG. 6 by the darkened background for the "DEFAULT" entry for the bold/italicized font in panel 606) activates or enables a font selection procedure for that typeface or other electronic text category. Once activated or enabled, further input of an available font from the available fonts portion or panel 602 (as indicated by the selection of "Arial Bold+Italics" from Foundry C in panel 602) will change the selected font for the selected typeface (or other designated electronic text portion) to the newly selected font for that typeface. If desired, the "Available Fonts" listing presented in portion or panel 602 may be limited to available fonts for the selected typeface or category (e.g., in the illustrated example, the listed "Available Fonts" presented in panel 602 may be limited to bolded and italicized fonts, the other fonts may be presented but "unselectable," etc).

Once selected for the font management vault, the various selected fonts may be activated by clicking the "APPLY" icon 608. If a user determines that no changes from the previously selected fonts are desired, this Font Typeface Selection interface 600 may be closed without making changes by clicking the "EXIT" icon 610. Other options also may be provided.

FIG. 6 illustrates additional features that may be provided in conjunction with at least some examples of this invention. Specifically, in the user interface screen 600 of FIG. 6, a "selection scope panel" 612 is provided in which a user can selectively designate the scope to which the font typeface selections may be applied. While any desired level of scope may be applied without departing from this invention, in this illustrated example, the font selections may be selectively applied: (a) to a given electronic document, (b) to all documents within a given application program (e.g., within a word processing program, an email management program, a spreadsheet program, an electronic drawing or CAD type program, video game programs, document management programs, accounting programs, internet access or browser programs, etc.), or (c) as a system wide default. Of course, other selective application options may be provided without departing from the invention. Alternatively, if desired, no selective application options need be provided, and the designations may be applied at any desired default level (e.g., to an individual document, across the application program, etc.). As yet another example, if desired, the options selected may be applied as a default only in situations where a given electronic document and/or application program does not provide overriding designations, e.g., from user input data, etc.

Some examples of the invention may alternately employ a user interface with list similar or identical to the list displayed in panel 602, in order to allow a user to select desired fonts when creating or rendering electronic text including more than one type of font. For example, a user may wish to create or render an electronic document that includes some characters (e.g., title headings) in an Arial font, other characters (e.g., figure captions) in a Helvetica font, and still other characters (e.g., passages of text) in a Times New Roman font. With various examples of the invention, a user can employ a list, such as that displayed in panel 602, to designate which Arial font will be used for creating or rendering the document (e.g., the Arial font from Foundry B), which Helvetica font will be used for creating or rendering the document (e.g., the Helvetica font from Foundry B), and which Times New Roman font will be used for creating or rendering the document (e.g., the Times New Roman font from Foundry C). Of course, it will be appreciated that specific typefaces within a font type may be designated using this type of interface. Still further, this type of interface may be configured to prevent a user from inadvertently selecting two different fonts having the same name. For example, if a user selects a Helvetica Bold font from Foundry A, and then later attempts to select a Helvetica Bold font from Foundry D, the user interface may automatically deselect the Helvetica Bold font from Foundry A, or prevent the user from selecting the Helvetica Bold font from Foundry D until the user first deselects the Helvetica Bold font from Foundry A.

Of course, the look and feel of the user interface may vary widely without departing from this invention, and the various manners in which the systems, methods, and interfaces operate or the manner in which they appear at various points during user interaction therewith may vary widely without departing from this invention. The look and feel and/or other variations in the appearance of and/or interactions with the user interfaces may be altered or controlled in any desired manner, including in conventional manners known and used in the art, such as in the various manners used in versions of the Macintosh® and Windows® based computer operating systems and/or the various known application programs that operate thereon (versions of the Macintosh® computer operating system is available from Apple Computer, Inc., and versions of the Windows® computer operating system is available from Microsoft Corporation of Redmond, Wash.). Also, the user interfaces for changing, selecting, and controlling fonts, e.g., for the various different typefaces, as described above, may be accessed through or at any desired level on the computer system, e.g., through or at an individual, document by document level, through or at an application program level, through or at the computer operating system level (e.g., through a "Start" or desktop menu, etc.), through or at a network setting, etc. The changes made at any given time also may be applied at any desired level on the computer system, e.g., at an individual, document by document level, at an application program level, at the computer operating system level, at a computer network level, etc.

It should be appreciated that, in addition to having a user interface that allows a user to manually request the separation and activation of individual fonts from among one or more a multi-font suitcases, various implementations of the invention may alternately or additionally employ data contained in an electronic document to request the separation and activation of individual fonts from among one or more a multi-font suitcases. For example, an electronic document may contain embedded data, such as metadata, specifying a particular font that should be used to render a character. Various implementations of the invention may use this embedded data to request the separation and activation of fonts from among one or more a multi-font suitcases. Still further, the systems and methods according to various examples of the invention may alternately or additionally create such embedded data based upon specific fonts selected by a user as described above. For example, a user may requests that a document be created and rendered using an Arial font from Foundry B, a Helvetica font from Foundry B, and a Times New Roman font from Foundry C. Various implementations of the invention may then embed data into the created document specifying the user of these particular fonts for subsequent rendering or editing of the document.

It should be appreciated that, while different fonts have been distinguished herein by their originating foundry for ease of understanding, various implementations of the invention may distinguish different fonts based upon any desired criteria. For example, some implementations of the invention may distinguish fonts based upon version. As will be appreciated by those of ordinary skill in the art, an newer version of a font from a foundry may include some characters, such as the "€" symbol for the Euro, while an older version of the same font from the same foundry may omit this character. Further, spacing and other features may change from version to version of a font, even from a single foundry. Accordingly, various implementations of the invention may employ any desired criteria to identify a font, including, for example, type, foundry, and version. Some embodiments of the invention may alternately or additionally identify a font based upon a checksum value obtained from various characteristics of the font, such as its outline data, width, and kerning tables.

Activation of the selected fonts for the various different font typefaces in the manner described above allows an individual font typeface to be activated from a multi-font suitcase without requiring that the entire multi-font suitcase's set of fonts be activated (e.g., without adding the entire multi-font suitcase's set of fonts to be added to the font management vault). These features give users the ability to turn "on" or "off" a single font within a suitcase file that contains multiple fonts. The font managing system's user interface (U/I) can be designed to give users feedback indicating when any arbitrary combination of fonts are activated/deactivated based on their input to the U/I. The application programs on or available through the system (such as a word processor, etc.) also can indicate the user's requested combination of fonts as the active or selected fonts on the system at any given time. These features allow users to avoid the above example of having to deal with the incorrect activation of font "B" from Foundry 1 when font "B" from Foundry 2 was desired.

The font management vault may be stored at any desired location or level of a computer system without departing from the invention, such as at an individual electronic document level, at an application program level, at the operating system level, at the network level, etc. If desired, the font management vault on a computer system may receive input via data stored in or associated with an electronic document (e.g., metadata indicating the fonts (e.g., for font typefaces)) and/or stored in or associated with an application program or operating system to be used in rendering an electronic document. Other arrangements are possible without departing from this invention.

With various implementation of the invention discussed above, fonts separated from one or more multi-font suitcases are stored in a single font vault for activation. It should be appreciated, however, that some embodiments of the invention may employ more than one font vault. For example, some implementations of the invention may allow a user to create one font vault for one type of electronic document (e.g., documents from a first source), and another, different font vault for another type of electronic document (e.g., documents from a first source). If multiple font vaults are employed, then a user may designate which vault will have its included fonts activated to render, create or edit a document. With some implementations, if there is no content overlap between multiple font vaults, then multiple font vaults may be simultaneously selected. It also should be appreciated, however, that various implementations of the invention may omit the use of a font vault.

For example, with some embodiments of the invention, a requested font may be separated from other fonts in a multi-font suitcase and immediately activated. Thus, referring back to the flowchart illustrated in FIG. 3, systems and method implementing these embodiments of the invention will determine if a requested font is ready for activation in step S304. Rather than determining if the requested font is in the font vault, however, the systems and method implementing these embodiments of the invention may determine if a requested font has already been activated, if has already been loaded into memory for activation, or both. The step S316 of storing the font in the font vault can then be omitted.

Still further, with some embodiments of the invention, a requested font may be separated from other fonts in a multi-font suitcase by marking the requested font for separate activation. For example, when a requested font is identified in a multi-font suitcase, systems and methods according to these embodiments of the invention may attach or otherwise associate some data, such as metadata, with the requested font to designate it as being "separate" from the other fonts in the multi-font suitcase. When the requested font or fonts are then activated, they may not be activated from a font vault as described above. Instead, systems and methods according to these embodiments of the invention will search each multi-font suitcase for marked fonts, and activate those fonts that have been appropriately marked. Thus, referring back to the flowchart illustrated in FIG. 3, systems and method implementing these embodiments of the invention will determine if a requested font is ready for activation in step S304. Rather than determining if the requested font is in the font vault, however, the systems and method implementing these embodiments of the invention may perform this step by determining if a requested font has already been marked as a separate font. Again, the step S316 of storing the font in the font vault can then be omitted. Of course, still other techniques for separating a requested font from the other fonts in a multi-font suitcase may be employed according to various examples of the invention.

Additional aspects of the present invention also relate to computer-readable media including computer-executable instructions stored thereon for performing the various font activation and/or management methods, for use in various systems for activating and/or managing fonts, and/or for providing and operating the various font activation and/or management user interfaces, as described above. The computer-readable media may constitute computer-executable instructions stored on the various types of computer-readable media. The term "computer-readable medium," as used herein, means any available data storage media that can be accessed or used on a computer system (by a user, by the system, etc.). By way of example, and not limitation, "computer-readable media" may include computer storage media and communication media. "Computer storage media" includes volatile and nonvolatile, removable and non-removable media implemented in any method or technology for storage of information, such as computer-readable instructions, data structures, program modules or other data. "Computer storage media" includes, but is not limited to, RAM, ROM, EEPROM, flash memory or other memory technology;

CD-ROM, digital versatile disks (DVD) or other optical storage devices; magnetic cassettes, magnetic tape, magnetic disk storage or other magnetic storage devices; or any other medium that can be used to store the desired information and that can be accessed by a computer. "Communication media" typically embodies computer-readable instructions, data structures, program modules or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared and other wireless media. Combinations of any of the above should also be included within the scope of "computer-readable media."

III. Conclusion

Various examples of the present invention have been described above, and it will be understood by those of ordinary skill that the present invention includes within its scope all combinations and subcombinations of these examples. Additionally, those skilled in the art will recognize that the above examples simply exemplify various aspects of the invention. The various specific steps and/or architectural elements described above can be changed, and functions or method steps may be added, deleted, combined, and/or changed in order without departing from the invention. Thus, various changes and modifications may be made without departing from the spirit and scope of the invention, as defined in the appended claims.

The invention claimed is:

1. A method of activating a font, comprising:
    receiving, by a computing system, input requesting activation of a font;
    determining, by the computing system, that the font does not exist in a font management vault;
    upon determining that the font does not exist in the font management vault, identifying the font in one multi-font suitcase file of a plurality of multi-font suitcase files, each multi-font suitcase file of the plurality including a similarly named version of the font, separating the font from the multi-font suitcase file, and saving the separated font in the font management vault; and
    activating, by the computing system, the font from the font management vault.

2. A method of activating a font according to claim 1, further comprising:
    prior to determining that the font does not exist in the font management vault, creating the font management vault.

3. A method of activating a font according to claim 1, wherein the font is activated as a default font for at least a portion of an electronic document.

4. A method of activating a font according to claim 1, wherein the font is activated as a default font for use in an application program.

5. A method of activating a font according to claim 1, wherein the font is activated as a default font for use in multiple programs activated on or used through a personal computer.

6. A method of activating a font according to claim 1, further comprising:
    rendering an electronic document, wherein at least some portion of the electronic document is rendered using the font as activated from the font management vault.

7. A method of activating a font according to claim 1, wherein data for generating the input requesting activation of the font is stored as a portion of an electronic document.

8. A method of activating a font according to claim 1, wherein data for generating the input requesting activation of the font is stored as a portion of an application program.

9. A method of activating a font according to claim 1, wherein data for generating the input requesting activation of the font is stored as a portion of a personal computer operating system.

10. A method of activating a font according to claim 1, wherein the input requesting activation of the font is generated when an electronic document is opened.

11. A method of activating a font according to claim 1, wherein the input requesting activation of the font is generated when an application program is opened.

12. A method of activating a font according to claim 1, wherein the input requesting activation of the font is generated when a personal computer operating system is started.

13. A method for managing active fonts on a computer system, comprising:
    receiving, by a computing system, input requesting activation of a first font for rendering a first portion of an electronic document;
    receiving, by the computing system, input requesting activation of a second font for rendering a second portion of the electronic document;
    determining, by the computing system, that the first font and the second font do not exist in a font management vault;
    upon determining that the first font does not exist in the font management vault, identifying the first font in a first multi-font suitcase file of a first plurality of multi-font suitcase files, each multi-font suitcase file of the first plurality including a similarly named version of the first font, separating the first font from the first multi-font suitcase file, and saving the separated first font in the font management vault; and
    upon determining that the second font does not exist in the font management vault, identifying the second font in a second multi-font suitcase file, separating the second font from the second multi-font suitcase file, and saving the separated second font in the font management vault.

14. A method for managing active fonts according to claim 13, further comprising:
    activating the first font and the second font from the font management vault.

15. A method for managing active fonts according to claim 13, further comprising:
    rendering the electronic document using the first font and the second font as activated from the font management vault.

16. A method for managing active fonts according to claim 13, further comprising:
    receiving input requesting activation of a third font for rendering a third portion of the electronic document;
    determining if the third font already exists in the font management vault;
    when the third font does not exist in the font management vault, identifying the third font in one multi-font suitcase file, separating the third font from the identified multi-font suitcase file, and
    saving the separated third font in the font management vault.

17. A method for managing active fonts according to claim 16, wherein the third font is identified in the first multi-font suitcase file.

18. A method for managing active fonts according to claim 16, wherein the third font is identified in a third multi-font suitcase file that differs from the first multi-font suitcase file and the second multi-font suitcase file.

19. A non-transitory computer-readable medium including computer-executable instructions stored thereon for performing a method of activating a font, the method comprising:
receiving input requesting activation of a font;
determining that the font does not exist in a font management vault;
upon determining that the font does not exist in the font management vault, identifying the font in one multi-font suitcase file of a plurality of multi-font suitcase files, each multi-font suitcase file of the plurality including a similarly named version of the font, separating the font from the multi-font suitcase file, and saving the separated font in the font management vault; and
activating the font from the font management vault.

20. A computer-readable medium according to claim 19, wherein the method further includes:
prior to determining that the font does not exist in the font management vault, creating the font management vault.

21. A computer-readable medium according to claim 19, wherein the font is activated as a default font for at least a portion of an electronic document.

22. A computer-readable medium according to claim 19, wherein the font is activated as a default font for use in an application program.

23. A computer-readable medium according to claim 19, wherein the font is activated as a default font for use in multiple programs activated on or used through a personal computer.

24. A computer-readable medium according to claim 19, wherein the method further includes:
rendering an electronic document, wherein at least some portion of the electronic document is rendered using the font as activated from the font management vault.

25. A computer-readable medium according to claim 19, wherein the computer-readable medium further includes data stored thereon corresponding to an electronic document, wherein data for generating the input requesting activation of the font is stored as a portion of the electronic document.

26. A computer-readable medium according to claim 19, wherein the computer-readable medium further includes data stored thereon for activating an application program, wherein data for generating the input requesting activation of the font is stored as a portion of the application program.

27. A computer-readable medium according to claim 19, wherein the computer-readable medium further includes data stored thereon for a personal computer operating system, wherein data for generating the input requesting activation of the font is stored as a portion of the personal computer operating system.

28. A computer-readable medium according to claim 19, wherein the method further includes opening an electronic document, wherein the input requesting activation of the font is received when the electronic document is opened.

29. A computer-readable medium according to claim 19, wherein the method further includes opening an application program, wherein the input requesting activation of the font is received when the application program is opened.

30. A computer-readable medium according to claim 19, wherein the method further includes starting a personal computer operating system, wherein the input requesting activation of the font is received when the personal computer operating system is started.

31. A non-transitory computer-readable medium including computer-executable instructions stored thereon for performing a method for managing active fonts on a computer system, the method comprising:
receiving input requesting activation of a first font for rendering a first portion of an electronic document;
receiving input requesting activation of a second font for rendering a second portion of the electronic document;
determining that the first font and the second font do not exist in a font management vault;
upon determining that the first font does not exist in the font management vault, identifying the first font in a first multi-font suitcase file of a first plurality of multi-font suitcase files, each multi-font suitcase file of the first plurality including a similarly named version of the first font, separating the first font from the first multi-font suitcase file, and saving the separated first font in the font management vault; and
upon determining that the second font does not exist in the font management vault, identifying the second font in a second multi-font suitcase file, separating the second font from the second multi-font suitcase file, and saving the separated second font in the font management vault.

32. A computer-readable medium according to claim 31, wherein the method further includes:
activating the first font and the second font from the font management vault.

33. A computer-readable medium according to claim 31, wherein the method further includes:
rendering the electronic document using the first font and the second font as activated from the font management vault.

34. A computer-readable medium according to claim 31, wherein the method further includes:
receiving input requesting activation of a third font for rendering a third portion of the electronic document;
determining if the third font already exists in the font management vault;
when the third font does not exist in the font management vault, identifying the third font in one multi-font suitcase file, separating the third font from the identified multi-font suitcase file, and saving the separated third font in the font management vault.

35. A computer-readable medium according to claim 34, wherein the third font is identified in the first multi-font suitcase file.

36. A computer-readable medium according to claim 34, wherein the third font is identified in a third multi-font suitcase file that differs from the first multi-font suitcase file and the second multi-font suitcase file.

37. A system for activating a font, comprising:
an input for receiving input data requesting activation of a font; and
a processor system programmed and adapted to: (a) determine that the font does not exist in a font management vault, (b) upon determining that the font does not exist in the font management vault: (i) identify the font in one multi-font suitcase file of a plurality of multi-font suitcase files, each multi-font suitcase file of the plurality including a similarly named version of the font, (ii) separate the font from the multi-font suitcase file, and (iii) save the separated font in the font management vault, and (c) activate the font from the font management vault.

38. A system according to claim 37, wherein the processor system is further programmed and adapted to create the font management vault prior to determining that the font does not exist in the font management vault.

39. A system according to claim 37, wherein the font is activated as a default font for at least a portion of an electronic document.

40. A system according to claim 37, wherein the font is activated as a default font for use in an application program.

41. A system according to claim 37, wherein the font is activated as a default font for use in multiple programs activated on or used through a personal computer.

42. A system according to claim 37, wherein the processor system is further programmed and adapted to render an electronic document, wherein at least some portion of the electronic document is rendered using the font as activated from the font management vault.

43. A system according to claim 37, wherein the input data requesting activation of the font is stored as a portion of an electronic document.

44. A system according to claim 37, wherein the input data requesting activation of the font is stored as a portion of an application program.

45. A system according to claim 37, wherein the input data requesting activation of the font is stored as a portion of a personal computer operating system.

46. A system according to claim 37, wherein the input data requesting activation of the font is generated when an electronic document is opened.

47. A system according to claim 37, wherein the input data requesting activation of the font is generated when an application program is opened.

48. A system according to claim 37, wherein the input data requesting activation of the font is generated when a personal computer operating system is started.

49. A system according to claim 37, further comprising:
a display device for displaying an electronic document using the font as activated from the font management vault.

50. A system according to claim 37, further comprising:
a printing system for printing an electronic document using the font as activated from the font management vault.

51. A system for managing active fonts on a computer system, comprising:
an input for receiving input data requesting activation of a first font for rendering a first portion of an electronic document and a second font for rendering a second portion of the electronic document; and
a processor system programmed and adapted to: (a) determine that the first font and the second font do not exist in a font management vault, (b) upon determining that the first font does not exist in the font management vault: (i) identify the first font in a first multi-font suitcase file of a first plurality of multi-font suitcase files, each multi-font suitcase file of the first plurality including a similarly named version of the first font, (ii) separate the first font from the first multi-font suitcase file, and (iii) save the separated first font in the font management vault, and (c) upon determining that the second font does not exist in the font management vault: (i) identify the second font in a second multi-font suitcase file, (ii) separate the second font from the second multi-font suitcase file, and (iii) save the separated second font in the font management vault.

52. A system according to claim 51, wherein the processor system is further programmed and adapted to activate the first font and the second font from the font management vault.

53. A system according to claim 51, wherein the processor system is further programmed and adapted to render the electronic document using the first font and the second font as activated from the font management vault.

54. A system according to claim 51, wherein the input further receives input data requesting activation of a third font for rendering a third portion of the electronic document, and
wherein the processor system is further programmed and adapted to: (d) determine if the third font already exists in the font management vault, and (e) when the third font does not exist in the font management vault: (i) identifying the third font in one multi-font suitcase file, (ii) separating the third font from the identified multi-font suitcase file, and (iii) the separated third font in the font management vault.

55. A system according to claim 54, wherein the third font is identified in the first multi-font suitcase file.

56. A system according to claim 54, wherein the third font is identified in a third multi-font suitcase file that differs from the first multi-font suitcase file and the second multi-font suitcase file.

57. A system according to claim 51, further comprising:
a display device for displaying an electronic document using the font as activated from the font management vault.

58. A system according to claim 51, further comprising:
a printing system for printing an electronic document using the font as activated from the font management vault.

59. A method of activating a font, comprising:
receiving, by a computing system, input requesting activation of a font;
determining that the font is not ready for activation;
upon determining that the font is not ready for activation, identifying the font in one multi-font suitcase file of a plurality of multi-font suitcase files, each multi-font suitcase file of the plurality including a similarly named version of the font, separating the font from the multi-font suitcase file, and saving the separated font in a font management vault; and
activating the font from the font management vault.

60. A method of activating a font according to claim 59, wherein the font is activated as a default font for at least a portion of an electronic document.

61. A method of activating a font according to claim 59, wherein the font is activated as a default font for use in an application program.

62. A method of activating a font according to claim 59, wherein the font is activated as a default font for use in multiple programs activated on or used through a personal computer.

63. A method of activating a font according to claim 59, further comprising:
rendering an electronic document, wherein at least some portion of the electronic document is rendered using the font as activated from the font management vault.

64. A method of activating a font according to claim 59, wherein data for generating the input requesting activation of the font is stored as a portion of an electronic document.

65. A method of activating a font according to claim 59, wherein data for generating the input requesting activation of the font is stored as a portion of an application program.

66. A method of activating a font according to claim 59, wherein data for generating the input requesting activation of the font is stored as a portion of a personal computer operating system.

67. A method of activating a font according to claim 59, wherein the input requesting activation of the font is generated when an electronic document is opened.

68. A method of activating a font according to claim 59, wherein the input requesting activation of the font is generated when an application program is opened.

69. A method of activating a font according to claim 59, wherein the input requesting activation of the font is generated when a personal computer operating system is started.

70. A method of activation a font according to claim 59, wherein the requested font is marked as separate from other fonts in the multi-font suitcase file.

71. A method for managing active fonts on a computer system, comprising:
 receiving input requesting activation of a first font for rendering a first portion of an electronic document;
 receiving input requesting activation of a second font for rendering a second portion of the electronic document;
 determining that the first font and the second font are not ready for activation;
 upon determining that the first font is not ready for activation, identifying the first font in a first multi-font suitcase file of a first plurality of multi-font suitcase files, each multi-font suitcase file of the first plurality including a similarly named version of the first font, and separating the first font from the first multi-font suitcase file;
 upon determining that the second font ready is not ready for activation, identifying the second font in a second multi-font suitcase file, and separating the second font from the second multi-font suitcase file; and
 activating the separated first font and the separated second font.

72. The method for managing active fonts according to claim 71, further comprising
 separating the first font from the first multi-font suitcase file by marking the first font; and
 separating the second font from the second multi-font suitcase file by marking the second font.

73. A method for managing active fonts according to claim 71, further comprising:
 rendering the electronic document using the first font and the second font.

74. A method for managing active fonts according to claim 71, further comprising:
 receiving input requesting activation of a third font for rendering a third portion of the electronic document;
 determining if the third font is ready for activation;
 when the third font is not ready for activation, identifying the third font in one multi-font suitcase file, and separating the third font from the identified multi-font suitcase file; and
 activating the third font.

75. A method for managing active fonts according to claim 74, wherein the third font is identified in the first multi-font suitcase file.

76. A method for managing active fonts according to claim 74, wherein the third font is identified in a third multi-font suitcase file that differs from the first multi-font suitcase file and the second multi-font suitcase file.

77. The method for managing active fonts according to claim 74, further comprising separating the third font by marking the first font.

78. A non-transitory computer-readable medium including computer-executable instructions stored thereon for performing a method of activating a font, the method comprising:
 receiving input requesting activation of a font;
 determining that the font is not ready for activation;
 upon determining that the font is not ready for activation, identifying the font in one multi-font suitcase file of a plurality of multi-font suitcase files, each multi-font suitcase file of the plurality including a similarly named version of the font, separating the font from the multi-font suitcase file, and saving the separated font in a font management vault; and
 activating the font from the font management vault.

79. A computer-readable medium according to claim 78, wherein the font is activated as a default font for at least a portion of an electronic document.

80. A computer-readable medium according to claim 78, wherein the font is activated as a default font for use in an application program.

81. A computer-readable medium according to claim 78, wherein the font is activated as a default font for use in multiple programs activated on or used through a personal computer.

82. A computer-readable medium according to claim 78, wherein the method further includes:
 rendering an electronic document, wherein at least some portion of the electronic document is rendered using the font.

83. A computer-readable medium according to claim 78, wherein the computer-readable medium further includes data stored thereon corresponding to an electronic document, wherein data for generating the input requesting activation of the font is stored as a portion of the electronic document.

84. A computer-readable medium according to claim 78, wherein the computer-readable medium further includes data stored thereon for activating an application program, wherein data for generating the input requesting activation of the font is stored as a portion of the application program.

85. A computer-readable medium according to claim 78, wherein the computer-readable medium further includes data stored thereon for a personal computer operating system, wherein data for generating the input requesting activation of the font is stored as a portion of the personal computer operating system.

86. A computer-readable medium according to claim 78, wherein the method further includes opening an electronic document, wherein the input requesting activation of the font is received when the electronic document is opened.

87. A computer-readable medium according to claim 78, wherein the method further includes opening an application program, wherein the input requesting activation of the font is received when the application program is opened.

88. A computer-readable medium according to claim 78, wherein the method further includes starting a personal computer operating system, wherein the input requesting activation of the font is received when the personal computer operating system is started.

89. A computer-readable medium according to claim 78, wherein the method further includes separating the font by marking the font.

90. A non-transitory computer-readable medium including computer-executable instructions stored thereon for performing a method for managing active fonts on a computer system, the method comprising:
 receiving input requesting activation of a first font for rendering a first portion of an electronic document;
 receiving input requesting activation of a second font for rendering a second portion of the electronic document;
 determining that the first font and the second font are not ready for activation;
 upon determining that the first font is not ready for activation, identifying the first font in a first multi-font suitcase file of a first plurality of multi-font suitcase files, each multi-font suitcase file of the first plurality including a similarly named version of the first font, and separating the first font from the first multi-font suitcase file;

upon determining that the second font is not ready for activation, identifying the second font in a second multi-font suitcase file, and separating the second font from the second multi-font suitcase file; and activating the separated first font and the separated second font.

91. A system for activating a font, comprising:

an input for receiving input data requesting activation of a font; and a processor system programmed and adapted to: (a) determine that the font is not ready for activation, (b) upon determining that the font is not ready for activation: (i) identify the font in one multi-font suitcase file of a plurality of multi-font suitcase files, each multi-font suitcase file of the plurality including a similarly named version of the font, (ii) separate the font from the multi-font suitcase file, and (iii) save the separated font in a font management vault, and (c) activate the font from the font management vault.

92. A system for managing active fonts on a computer system, comprising:

an input for receiving input data requesting activation of a first font for rendering a first portion of an electronic document and a second font for rendering a second portion of the electronic document; and a processor system programmed and adapted to: (a) determine that the first font and the second font are not ready for activation, (b) upon determining that the first font is not ready for activation: (i) identify the first font in a first multi-font suitcase file of a first plurality of multi-font suitcase files, each multi-font suitcase file of the first plurality including a similarly named version of the first font, and (ii) separate the first font from the first multi-font suitcase file, (c) upon determining that the second font is not ready for activation: (i) identify the second font in a second multi-font suitcase file, and (ii) separate the second font from the second multi-font suitcase file; and (d) activate the separated first font and the separated second font.

* * * * *